July 8, 1969   W. C. HELLER, JR   3,454,442

ART OF THERMALLY JOINING MATERIALS

Filed Oct. 19, 1965

INVENTOR
WILLIAM C. HELLER, JR.
BY
Lieber & Nilles
ATTORNEYS

United States Patent Office 3,454,442
Patented July 8, 1969

3,454,442
ART OF THERMALLY JOINING MATERIALS
William C. Heller, Jr., 1840 N. Farwell Ave.,
Milwaukee, Wis. 53202
Filed Oct. 19, 1965, Ser. No. 497,819
Int. Cl. B29c 27/04
U.S. Cl. 156—273                    14 Claims

ABSTRACT OF THE DISCLOSURE

A method for thermally joining adjacent layers of thermoplastic material by dielectric heating includes the initial step of introducing a normally solid agent responsive to dielectric heating at the interface of the layers. The agent and the layers are then subjected to a high frequency electric field to dielectrically heat the agent and soften the layers. The layers are placed in contact to bond them together along the interface.

---

This invention relates to improvements in the art of dielectrically processing materials, and relates more particularly to a process for thermally joining two materials having low dielectric loss properties.

Generally speaking, dielectric thermal processing is a method of applying heat to a non-metallic thermal-responsive material. The material is inserted in a high frequency electric field. This causes the temperature of the material to rise because of the molecular disturbance created in the material. Such processing has been in use for a number of years, particularly in the molding and gluing of wood and the processing of certain plastics.

The amount of heat generated in the material when exposed to a high frequency electric field is dependent upon many factors. These factors include the frequency of the field, the applied voltage generating the electric field, the dimensions and configuration of the material being heated, and the dielectric constant and loss factors or properties of the particular material. The latter factors are physical properties of the particular material and are described in some detail in technical texts such as "The Modern Plastics Encyclopedia" published by Modern Plastics Magazine, 770 Lexington Ave., New York, N.Y.

Many materials have such low dielectric loss properties that inordinately high frequencies or inordinately large voltages must be applied to the material to obtain the desired increase in temperature. One common example of such a material is the plastic known as polyethylene. While this material is relatively inexpensive and durable, in addition to possessing excellent protective characteristics and other properties which make it highly desirable for commercial use, for example, as a packaging material, its dielectric loss factors are so low as to render it essentially impossible to economically treat this material by means of direct dielectric heating. Since such treatment most commonly takes the form of joining or sealing the polyethylene into a packaging container, economy and speed are essential factors in its use, and since the material is not readily dielectrically heatable, it must ordinarily be sealed by the external application of heat as through a heated bar or roller, the temperature of which must, of course, exceed the heat sealing temperature of the material per se. The temperature of the material must be heated above sealing temperatures throughout its thickness. However, the use of such a mechanism often results in wrinkling, puckering, charring, tearing, or adhesion of the material to the bar or wheel, and these difficulties are emphasized when operating an oriented material. The above problems are magnified if the speed at which the thermal processing is conducted is increased, since relatively higher temperatures must then be used. Additionally, variations in the thickness of the material being thermally processed have heretofore caused difficulty because if sufficient heat is supplied through the wheel or bar to thermally process the material properly at the thick areas, this heat will tend to be excessive in the thin areas thereby resulting in damage to the material. Other materials in addition to polyethylene suffer a similar inability to be dielectrically thermally processed. Such materials include the well-known plastics polypropylene and polystyrene amongst others.

Numerous attempts have heretofore been made to provide a process for dielectrically joining thermoplastic materials having low dielectric loss factors. For example, Hurrey et al., U.S. Patent No. 2,606,856, dated Aug. 12, 1952, suggests the application of a thermosetting adhesive having high dielectric loss factors through adjacent portions of the material. When a dielectric field is applied to the material, the adhesive is heated and bonds the adjacent portions of the material. While this prior method is satisfactory for some purposes, such bonding often lacks the mechanical strength or other characteristics required. Additionally in instances wherein such bonding is used to make food packages or containers, there is always the problem of contamination of the contents by the adhesive.

Another prior method has included the application of high dielectric loss liquid agents to the material along its adjacent portions. When the material is subjected to an electric field, the agent becomes heated and softens the material. The agent evaporates during its heating allowing the adjacent portions of the material to bond. See U.S. Patent No. 2,992,958 to Yamaguchi and U.S. Patent No. 2,859,153 to Zucht. However, the numerous difficulties with this type of process may be readily appreciated. Selection of the agent must be done with great care as must be the performance of the process to insure the desired temperatures in the material. Further, if the liquid agent evaporates too fast, it will not heat the material to the required extent. If the liquid agent does not evaporate fast enough it will interfere with the bonding of the material or cause other imperfections such as bubbles. These problems have therefore tended to make such a process impractical from a commercial standpoint.

Still other prior art methods have attempted to directly alter the dielectric properties of the material as by heating to increase its dielectric loss factors and allow further thermal processing dielectrically. See U.S. Patent No. 2,741,296 to Collins. However, such a process has also tended to make accurate control of heat difficult, and the process is moreover complicated and expensive to perform.

It is, therefore, an object of this invention to provide an improved method of dielectrically thermally joining thermoplastic materials having low dielectric loss factors which obviates the aforementioned disadvantages.

A further object of this invention is to provide a simplified method of dielectrically thermally joining thermoplastic materials which produces joints superior to those produced by prior processes.

Another object of this invention is to provide a dielectric thermal method or process in which heating occurs only in the area where joints are to be made and which is especially applicable to the packaging field although not limited thereto.

Yet another object of this invention is to provide a process for dielectrically thermally joining thermoplastic material which produces joints which are chemically stable over an extended period of time and throughout a wide temperature range to thereby resist chemical and physical changes.

Another object of this invention is to provide a method of dieletrically thermally joining thermoplastic materials which produces joints having highly desirable mechanical properties, including waterproofness, flexibility, elasticity, and strength.

A further object of the present invention is to provide a method of dielectrically thermally joining thermoplastic material wherein the heat for sealing is generated at the interface without materially altering the physical and/or chemical characteristics of the material while forming superior joints at high operating speeds on either oriented or unoriented materials without the usual difficulties.

Yet another object of this invention is to provide a method of dielectrically thermally joining thermoplastic materials of various thicknesses while obtaining uniform results.

The improved method of the present invention utilizes standard, commercially available materials, and requires no special formulation or pretreatment of such materials thereby making the performance of the method highly practical and low in cost.

A further object of the invention is to provide a method of dielectrically thermally joining thermoplastic materials which employs normally non-liquid or dry components which may be applied in their normal state or in the presence of a fluid applicator or carrier to thereby provide ease in the handling and utilization of the various substances required by the process.

Another more specific object of this invention is to provide a dielectric thermal method which may be readily utilized to advantage in the formation of packages or containers by joining the edges of sheets of thermoplastic material, the method employing no steps or compounds which would contaminate the contents of the package.

Another specific object of this invention is to produce joints which may be transparent or colored, as desired, thereby adding esthetic or commercial appeal to the packages produced by the method.

Briefly, the present invention provides a method for thermally joining two adjacent layers of thermoplastic material having low dielectric loss factors by means of a high frequency electric field and by applying an agent responsive to dielectric heating to adjacent surfaces of the layers so that portions of the layers near the agent may be placed in contact with each other. The agent and the material are then subjected to a high frequency electric field which causes the agent to become heated, softening the portions of the material near the agent to thereby bond adjacent surfaces of the layers of material when in contact.

The invention, both as to its features and advantages, may be better understood by reference to the following specification and drawings, forming a part thereof, in which:

FIGURES 1A and 1B diagrammatically illustrate the initial step in the performance of the process of the present invention;

While the process may be performed on many different materials of varying thicknesses and having diverse configurations, it may be explained in typical exemplary form by the illustration of the joinder of two sheets of polyethylene material in an overlapping seam.

Figure 1A:
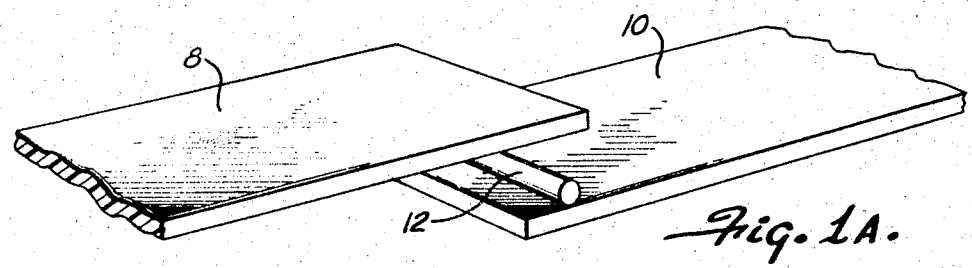
Figure 1B:
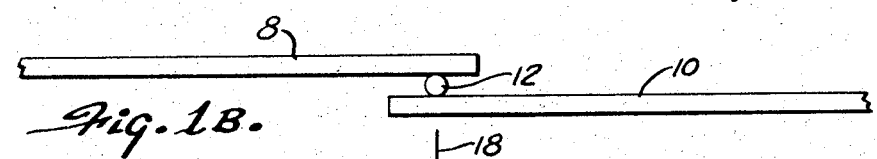

As shown in FIGURE 1, the two sheets of material 8 and 10 are arranged in adjacent face-to-face or in overlapping position. A dielectrically heatable agent 12 is applied to an interface area or is placed between the sheets to occupy only a portion of the overlap of sheets 8 and 10.

Agent 12 is preferably a solid, normally dry substance either in relatively rigid or in powdery form possessing the desired mechanical, thermal and dielectric properties. It is shown in FIGURE 1 as being applied in the form of a thin filament. As will be subsequently pointed out, the agent may be applied in many other physical forms.

The agent 12 must have sufficiently high dielectric loss properties to permit it to be heated when inserted in a high frequency electric field. Additionally, it should assume a semi-solid or highly viscous state when heated dielectrically without materially decomposing or noticeably emitting vapors at sealing temperatures.

The agent should preferably also have a cross-sectional thickness ranging from a minimum sufficient to heat the material being joined to sealing temperatures to a desirable maximum thickness of about .05 inch or greater. The agent may be transparent, opaque, or colored, as desired.

By way of example, halogenated polymers, such as the polymers and co-polymers of vinyl chloride, vinyl fluoride, vinylidene chloride, and vinylidene fluoride are suitable for use as the agent 12. Depending upon the application, the bond desired, and the properties of the materials being sealed, the agent 12 may be of a type which is relatively rigid possessing a definite shape or it may be in particulate form. Other typical groups of materials that may suitably serve as the agent 12 include the polycarbonates, the polyurethanes, polyacetals, and cellulose derivatives which are readily available and relatively inexpensive.

Figure 2:
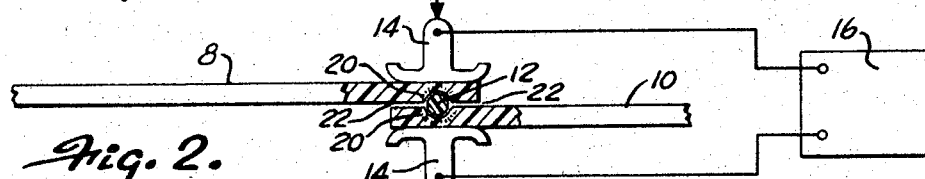
FIGURE 2 shows a subsequent step in the performance of the improved process of the present invention.

With the materials arranged in overlapping position, as shown in FIGURE 1, dielectric heating electrodes 14 are placed in position for heating as shown in FIGURE 2. While conventional bar-type electrodes are shown schematically in FIGURE 2, other configurations such as a wheel or roller type electrode may be utilized. Furthermore, electrodes 14 may be arranged in the shape of the finished product, such as is commonly done in the manufacture of air mattresses, shower curtains, plastic raincoats, and the like.

Electrodes 14 are connected to a power source for generating the high frequency electric field. Such power sources are well known in the art and may, for example, comprise a vacuum tube power oscillator. Frequencies above approximately 2 megacycles may be used to perform the process of the present invention.

Figure 3:
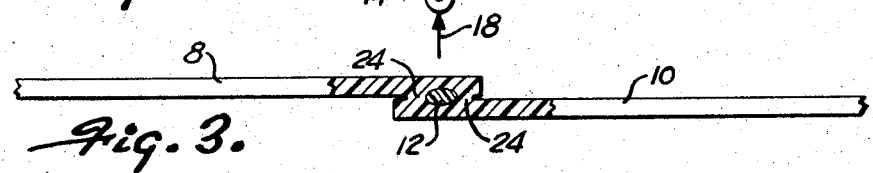
FIGURE 3 illustrates the completed joint formed by the process of the present invention.

Upon energizing the electrodes 14 by means of power source 16, a high frequency electric field is generated between the two electrodes. This field causes heat to be generated by dielectric losses in the agent 12, while sheets 8 and 10, having low dielectric loss factors, do not experience appreciable dielectric heating. As agent 12 increases in temperature, with the aid of nominal pressure applied to the electrodes 14 in the direction of the arrows 18, heat will transfer principally by conduction to sheets 8 and 10 and will continue to conduct outwardly, creating heated zones 20 shown schematically in FIGURE 2. Within a very short time, the zones 20 will reach a temperature sufficient to soften the thermoplastic material of sheets 8 and 10. The pressure supplied by the electrodes 14 will move sheets 8 and 10 into contact with each other at regions 22 on either side of agent 12. The locally softened portions of the sheets 8 and 10 will join directly to one another, and will result in bonded regions 24 near agent 12 as shown in FIGURE 3. The high frequency electric field is then removed as by de-energization of the electrodes, and the bond is permitted to harden or is subjected to a cooling operation as by an air blast to speed the hardening process.

It will be appreciated that by the performance of the method of the present invention a direct bond is formed between sheet 8 and sheet 10. This bond is generally superior to other types, such as an adhesive bond, in qualities such as mechanical strength, flexibility, and transparency, if and when desired. Depending upon the type of agent 12 utilized, a bond may or may not occur between agent 12 and sheets 8 and 10. However, it is to be noted that a bond between the agent and the sheets is not necessary, and in many cases not desired, for the successful performance of the method of the present invention. Also, the method may be performed successfully on materials of various and/or varying thicknesses, with only local portions being heated in areas containing the agent.

The pressure supplied by electrodes 14 need be only sufficient to bring the softened portions 20 of sheets 8 and 10 into contact in areas 22 adjacent agent 12, and in some cases, no pressure whatsoever is required. Also, if desired, the pressure supplied by the electrodes may be increased as the sheets 8 and 10 become softened, and sufficient pressure may be used to flatten agent 12 to an oval form as shown in FIGURE 3 to present a smooth outer surface to the overlapping seam. This may be done by increased pressure or by selecting an agent 12 which is softened to some extent by the dielectric heating generated in the agent by the electric field. However, care should be taken to see that an agent 12 is used which will not become so fluent or flowable during the process as to lead to excessive spreading under the pressure of electrodes 14. For example, excessive spreading of the agent could limit the amount of area available to form direct bond 24 on either side of agent 12, and in some instances, it may be desirable to employ mechanical means such as embossing or the like to confine the agent to a predetermined area.

Figure 4A:
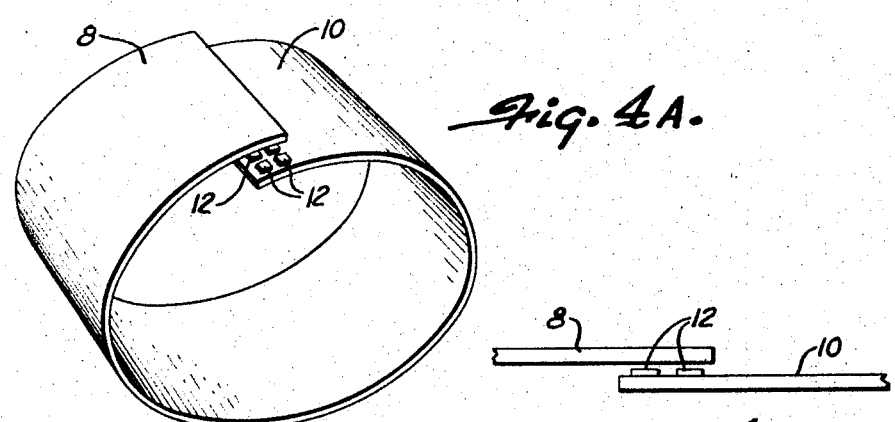
FIGURES 4A and 4B show in initial step in the performance of an alternate embodiment of the process of the present invention.
Figure 4B:
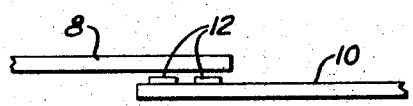
Figure 5:
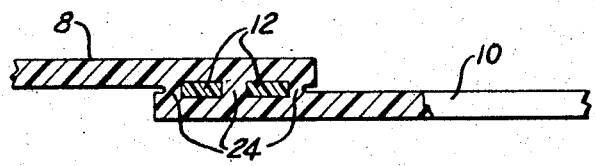
FIGURE 5 illustrates the completed joint formed by the process of the alternate embodiment of FIGURES 4A and 4B.

FIGURE 4 shows an alternate embodiment of the process of the present invention in which agent 12 is in a flattened, discontinuous form. This increases the area available for forming direct bonds 24 with the bonding occurring in the interstices. Additionally, since the agent 12 is already in flattened form the possibility of unwanted spreading of the agent is reduced. FIGURE 4A furthermore illustrates the invention as being applied to the fabrication of a tubular container such as used in the packaging field, the seam of the container being formed by means of the improved method.

It will also be appreciated, that numerous other forms of agent may be utilized. For example, the agent 12 may be applied in granulated or powdered form or it may be embodied in a relatively fluent carrier and applied as by printing, silk screen, gravure or the like. It could also be introduced in a paste or viscous form which hardens or becomes solid after introduction at the interface. In any event, the use of a dry, solid, agent eliminates the numerous problems of the prior art using liquid agents, including spilling, running or dripping. Moreover, the agent may be used as a booster for the heating of material, not necessarily in a sealing operation as illustrated and described. In addition, the method may be performed either as a batch or as a continuous process in an economical manner. It should also be understood that the term normally solid agent as used herein is intended to mean an agent which is in a solid shape-assuming or particulate state before heating whether applied by itself or incorporated in a carrier or applicator. Furthermore, the dielectric heating of the agent could be accompanied by a surface treatment of the material such as a conventional surface heating operation. If desirable or necessary, the electrodes of the heater may be coated with such materials as Teflon to eliminate or minimize the possibility of sticking, and the equipment used in practicing the method may be otherwise modified.

In accordance with the present invention it may also be necessary or desirable, as when operating on oriented materials wherein such material is relatively fragile when subjected to high heats, to preheat either the agent or the material per se prior to the actual sealing step to thereby reduce the amount of heat necessary to seal the material and avoid the necessity of applying sudden excessive heats at these local zones, while also accelerating the process.

Various modes of carrying out the invention are contemplated as being within the scope of the following claims particularly pointing out and distinctly claiming the subject matter which is regarded as the invention.

I claim:

1. A method for thermally joining adjacent layers of thermoplastic materials having relatively low dielectric loss properties by means of a high frequency electric field comprising, initially introducing a normally solid agent responsive to dielectric heating at the interface of the layers of materials to be joined, then subjecting said agent and said material to a high frequency electric field whereby said agent becomes heated dielectrically by said electric field and softens the portion of said layers adjacent said agent by conduction, and finally placing the adjacent softened portions of said layers in contact so as to bond the layers together along the interface.

2. A method of claim 1, wherein said normally solid agent is introduced in the form of a filament.

3. The method of claim 1, wherein said normally solid agent is introduced in the form of a circular filament ranging from a minimum thickness sufficient to heat the material to sealing temperatures to a maximum thickness of approximately .05 inch.

4. The method of claim 1, wherein said normally solid agent is introduced at a plurality of spaced areas so that said layers bond together in the interstices between said areas.

5. The method of claim 1, wherein said normally solid agent is introduced in granular form so that said layers may bond together in the interstices between the particles of said granulated agent.

6. The method of claim 1, wherein said normally solid agent is a thermoplastic material.

7. The method of claim 1, wherein a halogenated polymer is used as said normally solid agent.

8. The method of claim 1, wherein a normally rigid agent is introduced at the interface of the layers of material.

9. The method of claim 1, wherein a normally shapeless agent is introduced at the interface of said layers in the presence of a carrier.

10. The method of claim 1, wherein said agent and said material are subjected to a high frequency electric field so that said agent becomes heated by said field to provide further softening to said layers in addition to that produced by the dielectric losses of the material itself.

11. The method of claim 1, which includes the step of applying pressure to said layers so as to place them in intimate contact to form a bond between them.

12. The method of claim 1, wherein the material is preheated prior to the dielectric sealing step.

13. A method for thermally joining adjacent layers of thermoplastic materials having low dielectric loss factors by means of a high frequency electric field to form an article comprising, initially applying a normally solid agent responsive to dielectric heating to the adjacent surfaces of layers of materials at the locations to be joined to form the article, then subjecting said agent and said material to a high frequency electric field whereby said agent becomes heated by said electric field thereby softening the surface of said layers at said locations, and finally placing said adjacent surfaces in contact so said locations are bonded together to form the article.

14. The method of claim 13, wherein the article formed is in the nature of a packaging container.

References Cited

UNITED STATES PATENTS

| | | | |
|---|---|---|---|
| 2,087,480 | 7/1937 | Pitman | 156—273 |
| 2,407,833 | 9/1946 | Jablonsky | 156—273 |
| 2,570,921 | 10/1951 | Collins | 156—380 |
| 2,640,796 | 6/1953 | Langer | 156—274 |
| 2,859,153 | 11/1958 | Zucht | 156—273 |

FOREIGN PATENTS 955,285  4/1964  Great Britain.

DOUGLAS J. DRUMMOND, *Primary Examiner.*

U.S. Cl. X.R.

156—309